United States Patent
Ostrovsky-Berman (10) Patent No.: US 8,953,856 B2
(45) Date of Patent: Feb. 10, 2015

(54) METHOD AND SYSTEM FOR REGISTERING A MEDICAL IMAGE

(75) Inventor: Yaron Ostrovsky-Berman, Petach-Tikva (IL)

(73) Assignee: Algotec Systems Ltd., RaAnana (IL)

( * ) Notice: Subject to any disclaimer, the term of this patent is extended or adjusted under 35 U.S.C. 154(b) by 975 days.

(21) Appl. No.: 12/624,505

(22) Filed: Nov. 24, 2009

(65) Prior Publication Data

US 2010/0128953 A1 May 27, 2010

Related U.S. Application Data (60) Provisional application No. 61/117,585, filed on Nov. 25, 2008.

(51) Int. Cl.
*G06K 9/00* (2006.01)
*G06T 7/00* (2006.01)

(52) U.S. Cl.
CPC ............ *G06T 7/0032* (2013.01); *G06T 7/0034* (2013.01); *G06T 2207/10081* (2013.01); *G06T 2207/30004* (2013.01); *G06T 2207/30008* (2013.01); *G06T 2207/30061* (2013.01)
USPC .......................................... 382/128; 382/131

(58) Field of Classification Search
CPC ............ G06T 2207/10081; G06T 2207/20128
See application file for complete search history.

(56) References Cited

U.S. PATENT DOCUMENTS

| | | | |
|---|---|---|---|
| 7,123,760 B2 | 10/2006 | Mullick et al. | |
| 7,397,475 B2 | 7/2008 | Shen et al. | |
| 7,747,050 B2 * | 6/2010 | Lau et al. | 382/128 |
| 8,094,906 B2 * | 1/2012 | Porat et al. | 382/131 |
| 8,121,362 B2 * | 2/2012 | Zhan et al. | 382/128 |
| 8,660,635 B2 * | 2/2014 | Simon et al. | 600/424 |
| 2005/0110791 A1 | 5/2005 | Krishnamoorthy et al. | |
| 2005/0259856 A1 | 11/2005 | Dehmeshki | |
| 2006/0239553 A1 | 10/2006 | Florin et al. | |
| 2007/0002046 A1 * | 1/2007 | Tanacs et al. | 345/424 |
| 2007/0053589 A1 | 3/2007 | Gering | |
| 2009/0028403 A1 | 1/2009 | Bar-Aviv et al. | |
| 2010/0172567 A1 * | 7/2010 | Prokoski | 382/132 |

FOREIGN PATENT DOCUMENTS

WO  WO 2008/062415  * 5/2008 ............. G06T 17/40

OTHER PUBLICATIONS

Bookstein "Prinicpal Warps: Thin-Plate Splines and the Decomposition of Deformations", IEEE Transactions on Pattern Analysis and Machine Intelligence, 11(6): 567-585, Jun. 1989.

Cootes et al. "Active Shape Models—Their Training and Application", Computer Vision and Image Understanding, 61(1): 38-59, Jan. 1995.

(Continued)

*Primary Examiner* — Luke Gilligan
*Assistant Examiner* — Kristine Rapillo (57) ABSTRACT

A method for registering a medical image with a model mapping a skeletal structure. The method comprises receiving a medical image depicting a plurality of bones, providing a statistical model mapping a reference skeletal structure having a plurality of reference anatomical elements, and registering medical image with the statistical model according to at least one constraint defined by the plurality of reference anatomical elements.

24 Claims, 5 Drawing Sheets

(56) References Cited

OTHER PUBLICATIONS

Posada et al. "Towards A Noninvasive Intracranial Tumor Irradiation Using 3D Optical Imaging and Multimodal Data Registration", International Journal of Biomedical Imaging, 2007: 1-14, 2007.

Yeo et al. "Effects of Registration Regularization and Atlas Sharpness on Segmentation Accuracy", MICCAI 2007, Part I, LNCS 4791: 683-691, 2007.

Communication Pursuant to Rule 69 EPC—Reminder Concerning Payment of the Designation Fee (Art. 79(2) EPC) and of the Examination Fee (Art. 94(1) EPC)—and Invitation Pursuant to Rule 70a(1) EPC Dated Jun. 14, 2010 From the European Patent Office Re. Application No. 09176878.8.

Communication Pursuant to Article 94(3) EPC Dated Feb. 21, 2011 From the European Patent Office Re. Application No. 09176878.8.

Communication Pursuant to Article 94(3) EPC Dated Apr. 26, 2013 From the European Patent Office Re.: Application No. 09176878.8.

European Search Report and the European Search Opinion Dated Apr. 15, 2013 From the European Patent Office Re. Application No. 13156248.0.

Official Action Dated Feb. 27, 2013 From the US Patent and Trademark Office Re. U.S. Appl. No. 12/624,519.

Gong et al. "Anatomical Object Recognition and Labeling by Atlas-Based Focused Non-Rigid Registration and Region-Growing", International Conference on Audio, Language and Image Processing, ICALIP 2008, XP031298555, p. 1354-1358, Jul. 7, 2008.

Nain et al. "Vessel Segmentation Using a Shape Driven Flow", Field Programmable Logic and Application, XP055059594, 3216: 51-59, Sep. 26, 2004. Abstract.

European Search Report and the European Search Opinion Dated Nov. 17, 2010 From the European Patent Office Re. Application No. 09176874.7.

Response Dated Dec. 8, 2010 to Communication Pursuant to Rule 69 EPC—Reminder Concerning Payment of the Designation Fee (Art. 79(2) EPC) and of the Examination Fee (Art. 94(1) EPC)—and Invitation Pursuant to Rule 70a(1) EPC of Jun. 14, 2010 From the European Patent Office Re. Application No. 09176878.8.

Benameur et al. "3D/2D Registration and Segmentation of Scoliotic Vertebrae Using Statistical Models", Computerized Medical Imaging and Graphics, XP002322203, 27(5): 321-337, Sep. 1, 2003. Abstract, P.322, Last § —1-h Col., Section 3., 7., Figs.4, 10, 11.

Haas et al. "Automatic Segmentation of Thoracic and Pelvic CT Images for Radiotherapy Planning Using Implicit Anatomic Knowledge and Organ-Specific Segmentation Strategies", Physics in Medicine and Biology, XP002606162, 53(6): 1751-1771, Mar. 21, 2008. Abstract, Sections 2, 5, Table 1.

Van de Giessen et al. "Constrained Registration of Multiple Rigid Objects in Close Proximity Application in the Wrist Joint", 4th IEEE International Symposium on Biomedical Imaging: From Nano to Macro, ISBI 2007, XP031084371, p. 704-707, Apr. 1, 2007. Abstract, Section 2, Figs.2, 3, Section 4.

Van Straten et al. "Removal of Bone in CT Angiography of the Cervical Arteries by Piecewise Matched Mask Bone Elimination", Medical Physics, XP012075063, 31(10): 2924-2933, Oct. 1, 2004. Abstract, Section 2.

Invitation Pursuant to Article 94(3) and Rule 71(1) EPC Dated Oct. 27, 2011 From the European Patent Office Re. Application No. 09176878.8.

Official Action Dated Jun. 9, 2014 From the US Patent and Trademark Office Re. U.S. Appl. No. 12/624,519.

Official Action Dated Aug. 7, 2012 From the US Patent and Trademark Office Re. U.S. Appl. No. 12/624,519.

Betke et al. "Landmark Detection in the Chest and Registration of Lung Surfaces With an Application to Nodule Registration", Medical Image Analysis, 7: 265-281, 2003.

Response Dated Jun. 15, 2011 to European Search Report and the European Search.Opinion of Nov. 17, 2010 From the European Patent Office Re. Application No. 09176874.7.

Response Dated Aug. 30, 2011 to Communication Pursuant to Article 94(3) EPC of Feb. 21, 2011 From the European Patent Office Re. Application No. 09176878.8.

European Search Report and the European Search Opinion Dated Apr. 28, 2010 From the European Patent Office Re.: Application No. 09176878.8.

Fripp et al. "Automatic Segmentation of the Bones From MR Images of the Knee", 4th IEEE International Symposium on Biomedical Imaging: From Nano to Macro, XP031084279, p. 336-339, Apr. 1, 2007. p. 337, L-h Col., Last § —r-h Col., Figs.1, 2, 5, Abstract, Section 4.

Park et al. "Construction of an Abdominal Probalistic Atlas and Its Application in Segmentation", IEEE Transactions on Medical Imaging, XP011076452, 22(4): 483-492, Apr. 1, 2003. p. 483-484, 487.

Pham et al. "Current Methods in Medical Image Segmentation", Annual Review of Biomedical Engineering, XP009062827, 2: 315-337, Aug. 1, 2000.

Straka et al. "Bone Segmentation in CT-Angiography Data Using a Probalistic Atlas", Proceedings of International Workshop on Vision, Modeling and Visualization, XP002359576, p. 505-512, Jan. 1, 2003. Section 6, Fig.7.

* cited by examiner

FIG. 5

METHOD AND SYSTEM FOR REGISTERING A MEDICAL IMAGE

RELATED APPLICATION

This application claims the benefit of priority of U.S. Provisional Patent Application No. 61/117,585 filed on Nov. 25, 2008.

This application is also being co-filed with U.S. patent application Ser. No. 12/624,519 filed on Nov. 24, 2009, by Yaron Ostrovsky-Berman et al, entitled METHOD AND SYSTEM FOR SEGMENTING MEDICAL IMAGING DATA ACCORDING TO A SKELETAL ATLAS, which claims the benefit of priority of U.S. Provisional Patent Application No. 61/117,586 filed on Nov. 25, 2008.

The contents of the above applications are incorporated by reference as if fully set forth herein.

FIELD AND BACKGROUND OF THE INVENTION

The present invention, in some embodiments thereof, relates to a system and a method for registering medical imaging data, such as computed tomography (CT) images and, more particularly, but not exclusively, to a system and a method for using a binary atlas of the human skeleton for registering medical imaging data.

Medical images are images of a human subject that are analyzed for the purposes of biological and medical research, diagnosing and treating disease, injury and birth defects. Commonly, medical images involve modalities which are designed for capturing data for imaging internal organs and tissues in a non-invasive manner. Examples of such modalities include computed tomography (CT), magnetic resonance imaging (MRI), positron emission tomography (PET), ultrasound, fluoroscopy, conventional x-rays, and the like. Medical images may be analogue or digital, two-dimensional or three-dimensional; however, three-dimensional modalities are digital.

When medical images are taken for diagnosis they are usually meticulously inspected by computer aided diagnosis (CAD) systems and/or trained medical practitioners, for example radiologists, to detect instances of abnormality that may be indicative of diseases. Additionally, the medical images may be used to accurately locate lesions so that treatments such as chemotherapy and radiotherapy may be precisely delivered and surgery may be effectively planned.

As medical images are usually three or four dimensional, the practitioner may step through a sequence of two-dimensional image slices at regular intervals, inspecting each slice. Thus, inspection of medical images may be tedious and prone to error. Accordingly, methods of computer aided detection (CAD) have been developed for the automatic location, registration, and segmentation. CAD may also be used for locating, characterizing, segmenting and diagnosing anatomical structures.

During the last years, methods and system for medical image registration, such as medical image registration, have been developed. For example, US. Patent Application Publication No. 2008/0267483 published on Oct. 30, 2008 describes method for registering a medical image by acquiring a first medical image of a subject, synthesizing one or more simulated medical images based on the acquired first medical image; training one or more matching functions using the first medical image and the simulated medical images, acquiring a second medical image of the subject, and registering the first medical image and the second medical image using the one or more trained matching functions.

Another example is provided in U.S. Pat. No. 6,999,811, published on Feb. 14, 2006, that describes method and device for the registration of two 3D image data sets of an object to be examined. The object to be examined is provided with a plurality of markers In order to enable a registration to be carried out, the positions of the markers in the 3D image data sets are first determined in a co-ordinate system associated with the relevant 3D image data set. The distances between the markers and/or the angles formed between lines which intersect in a marker and extend through two further markers are then determined. Finally, a transformation rule for the transformation of one of the 3D image data sets to the co-ordinate system of the other 3D image data set is determined.

SUMMARY OF THE INVENTION

According to some embodiments of the present invention there is provided a method for registering a medical image with a model mapping a skeletal structure. The method comprises receiving a medical image depicting a plurality of bones, providing a statistical model mapping a reference skeletal structure having a plurality of reference anatomical elements, and registering medical image with the statistical model according to at least one constraint defined by the plurality of reference anatomical elements.

Optionally, the registering comprises registering each the bone to a respective the reference anatomical element.

Optionally, the statistical model statistically mapping a plurality of reference anatomical characteristics in each the reference anatomical element according to the distribution of a plurality of respective anatomical characteristics in a plurality of medical images each depicting a respective bone.

Optionally, the receiving comprises identifying a plurality of anchors each indicative of a specific anatomical characteristic in the medical image data, wherein the registering is performed according to a match between at least one of the plurality of anchors.

Optionally, the medical image data comprises a member of a group consisting of a computed tomography (CT) medical image, a positron emission tomography (PET), a magnetic resonance imaging (MRI), a PET-CT image, and a single photon emission computed tomography (SPECT) image.

Optionally, the method further comprises identifying a symmetry plane in the medical image and aligning the medical image according to the symmetry plane before the registering.

Optionally, the statistical model mapping at least one pelvis anchor in the skeletal structure, further comprising identifying a signature of the pelvis in the medical image, performing the registering by matching between the signature and the at least one pelvis anchor.

More optionally, the signature is a path connecting between pelvis extremities depicted in the medical image.

Optionally, the statistical model mapping at least one lungs characteristic in the skeletal structure, further comprising identifying a signature of the lungs in the medical image and performing the registering by matching between the signature and the at least one lungs characteristic.

Optionally, the registering comprises performing a plurality of warping transformations.

Optionally, the method further comprises segmenting a plurality of bones in the medical image, the registering comprises progressively registering the medical image data with the statistical model; wherein each the progressive registration is performed by registering a different the bone with at least one anatomical characteristic defined in a respective the reference anatomical element.

More optionally, the statistical model mapping a thin shell around the bones, at least one of the plurality of warping transformations being directed according to a correlation between the medical image and the thin shell.

More optionally, the statistical model mapping a distance between two bones of the skeletal structure, at least one of the plurality of warping transformations being directed according to a level of compliance of a current registration of two respective the bones with the distance.

More optionally, the plurality of warping transformations are directed according to a level of compliance of the current registration.

Optionally, the method further comprises the statistical model mapping a plurality of reference anatomical characteristics for each the reference anatomical element, the registering is constrained according to the plurality of reference anatomical characteristics.

Optionally, the registering comprises performing a transformation is based on at least one thin plate spline (TPS) transformation.

More optionally, the registering comprises separately registering each of a plurality of bones depicted in the medical image according to at least one of the plurality of reference anatomical characteristics of a respective the reference anatomical element.

According to some embodiments of the present invention there is provided an apparatus for registering a medical image with a model mapping a skeletal structure. The apparatus comprises an input interface configured for receiving a medical image of a plurality of bones of a patient, a repository configured for hosting a statistical model mapping a reference skeletal structure having a plurality of reference anatomical elements, and a registration module configured for registering the medical image with the statistical model according to at least one constraint defined by the plurality of reference anatomical elements.

Optionally, the apparatus is a picture archiving and communication system (PACS) workstation.

Optionally, the repository configured for hosting a plurality of statistical models each associated with at least one of a plurality of demographic segments, the input interface being configured for receiving medical data indicative of a patient demographic segment pertaining to the patient; wherein the statistical model is selected from the repository according to a match between the patient demographic segment and the plurality of demographic segments.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

The present invention, in some embodiments thereof, relates to a system and a method for registering medical imaging data, such as CT images and, more particularly, but not exclusively, to a system and a method for using a binary atlas of the human skeleton for registering medical imaging data.

According to some embodiments of the present invention, there is provided a method for registering a medical image depicting a plurality of bones with a skeletal atlas, such as a statistical shape model, mapping a skeletal structure. The method comprises receiving a medical image depicting a plurality of bones, such as a CT image of a human patient, providing a skeletal atlas mapping a skeletal structure having a plurality of reference anatomical elements, such as reference bones, and registering bones in the medical image with respective reference elements in the skeletal atlas.

Optionally, the skeletal atlas depicts substantially all the human skeleton. Optionally, each exemplary bone in the skeletal atlas is mapped in a statistical shape model. The mapping of the exemplary bone in the statistical shape model is defined according to properties of a respective bone in a plurality of medical images. Optionally, the registration is based on translation and optionally the torso affine transformation which are performed according to anchors in the medical image.

Optionally, the medical image is aligned according to a symmetry plane that divides the skeletal structure to right and left sides. Optionally, the medical image is registered by identifying one or more constraints, such as pelvis anchors, for example pelvis extremities, and registering the medical image by taking into account the anchors in the light of the constraints.

Optionally, the medical image is registered by identifying one or more lungs related anatomical characteristics therein and registering them with one or more respective anatomical characteristics in the skeletal atlas. Optionally, the registering is based on a plurality of warping transformations. Additionally or alternatively, the registration is confined and/or directed according to structural constraints, for example according to distances between the reference anatomical elements, such as reference bones. In such an embodiment, the distances constrain and/or direct the registration by scoring or sub-scoring the warping transformations.

According to some embodiments of the present invention, there is provided an apparatus for registering a medical image with an atlas mapping a skeletal structure. The apparatus comprises an input interface configured for receiving a medical image of a patient, a repository configured for storing a skeletal atlas mapping a reference skeletal structure having a plurality of reference anatomical elements, such as reference bones, a registration module configured for registering the medical image data with the skeletal atlas, and an output unit for outputting the registration and/or a registered version of the medical image.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Figure 1:
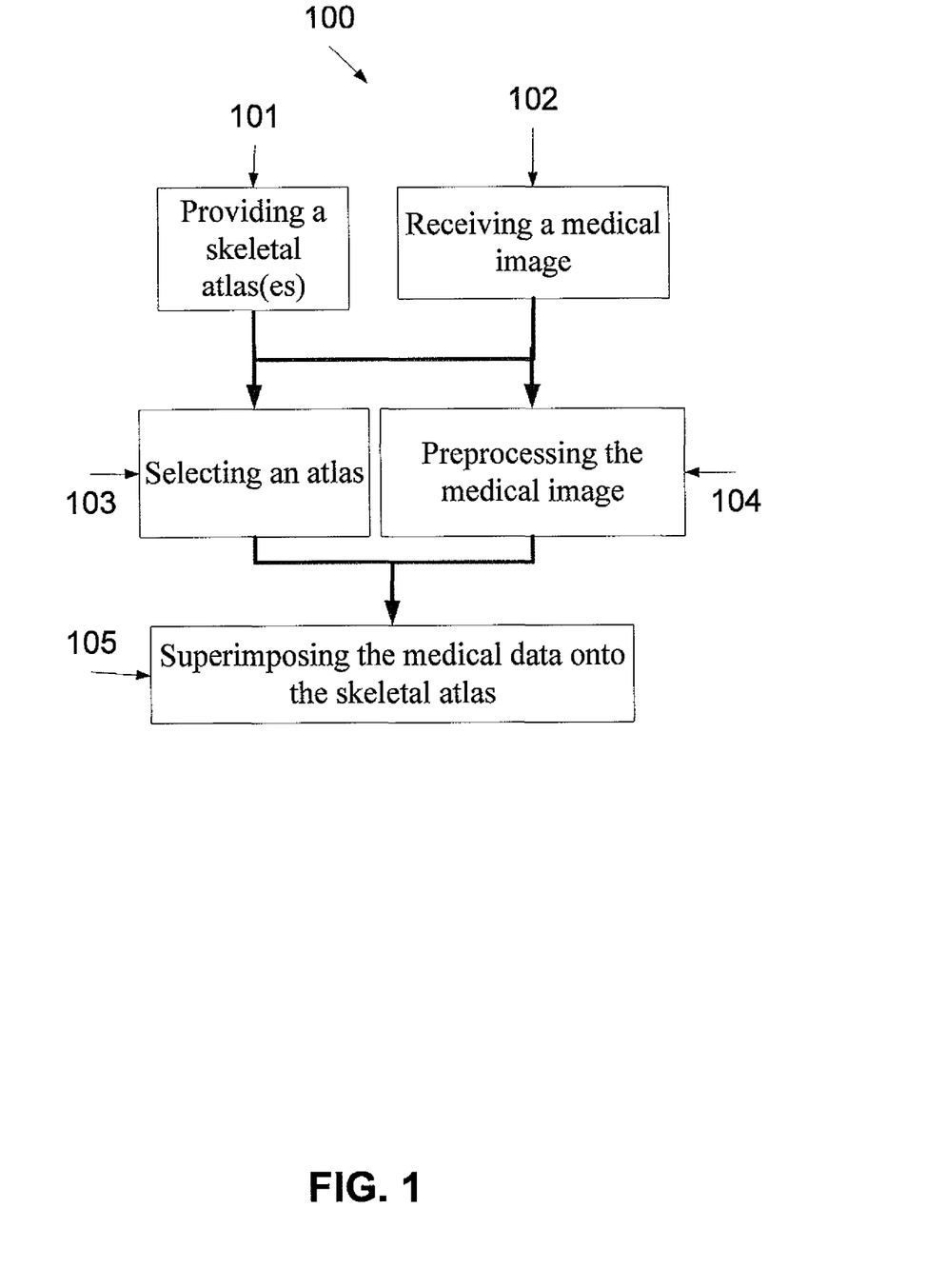
FIG. 1 is a flowchart of a method for receiving and registering a medical image according to a skeletal atlas, according to some embodiments of the present invention.

Reference is now made to FIG. 1, which is a flowchart of a method 100 for registering medical images with one or more maps and/or models of the human skeleton and/or any segment thereof, which may be referred to herein as a skeletal atlas, according to some embodiments of the present invention. As used herein, a medical image means a data set which is generated using one or more of the following techniques computed tomography (CT) medical image, positron Emission Tomography (PET), PET-CT, magnetic resonance imaging (MRI) and single photon emission computed tomography (SPECT).

First, as shown at 101, one or more skeletal atlases are provided. Each one of the one or more skeletal atlases maps a skeletal structure, such as a human skeleton and/or segments thereof. The skeletal atlases may be created in advance and hosted in a repository. Optionally, the repository is a local memory device. Optionally, the repository is a remote storage device, such as a network node, for example a server and/or any other memory device that is accessible via a communication network, such as the Internet.

Figure 2:
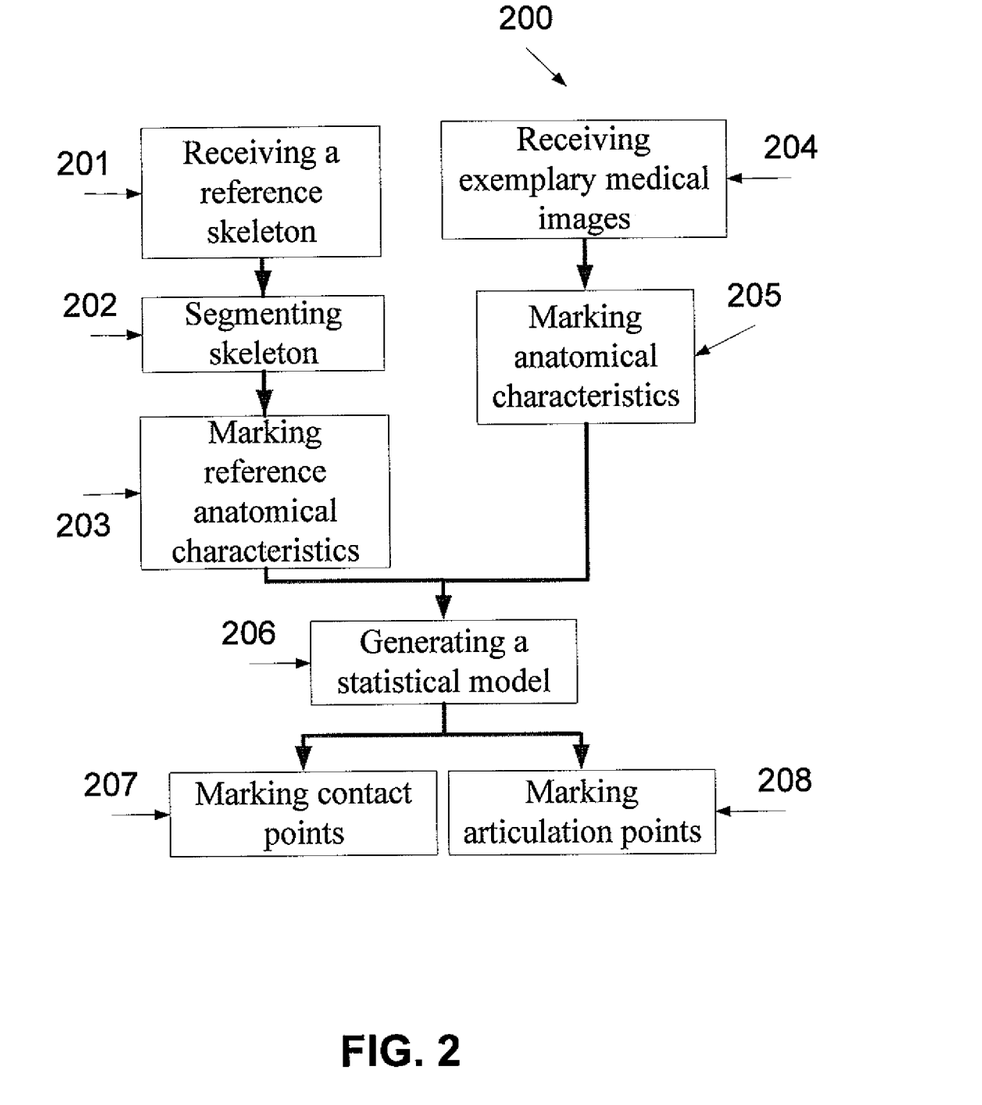
FIG. 2 is a flowchart of a method for creating a skeletal atlas, according to some embodiments of the present invention.

Reference is now also made to FIG. 2, which is a flowchart 200 of a method for creating a skeletal atlas, according to some embodiments of the present invention.

First, as shown at 201, a skeletal atlas that maps the bones in an exemplary reference skeleton is received. Optionally, one or more bones and/or group of bones, such as bones of a certain organ or a group of organs, in the reference skeleton is associated with one or more reference medical images, such as CT scans. Optionally, the lungs and other soft tissues are mapped within the same reference scan. The reference medical images are registered to the reference skeleton, manually and/or automatically, according to a common coordinate system. Optionally, three reference medical images, such as CT scans, are used: a lower body bones scan that depicts the lower limbs and the pelvis, a central scan that includes the upper limbs and the torso, and an upper scan that includes the skull and the neck bones.

As shown at 202, the reference skeleton is segmented to bones and/or organs, optionally manually. The reference medical images are segmented for binary masks of each bone. Such a binary segmentation are known in the art and therefore not further elaborated herein. The binary masks are used during the registration of input studies, for example as described below. The binary segmentation may be used as a bone mask during the registration process, for example as described below.

As shown at 203, each segment is marked, manually and/or automatically, with a plurality of reference anatomical characteristics. Optionally, the reference anatomical characteristics are used to create statistical shape models of the bones, for example as described below. For clarity, the segmented reference skeleton may be referred to herein as a reference frame. As used herein an anatomical characteristic means one or more osteologic characteristics which are based on skeletal characteristics and landmarks and/or any one or more indicative characteristics which may be identified and segmented, manually and/or automatically, in the skeletal atlas. For example, the indicative characteristics may be based on voxels representing areas in the skeleton, the lungs, the heart, the kidneys, the liver, and/or the spleen.

Now, as shown at 204-206 some or all of the bones in the reference frame are statistically modeled. Optionally, the statistical modeling allows a creation of a statistical shape model, referred to herein as a statistical shape variance model. First, as shown at 204, a plurality of exemplary medical images, for example 10, 20, 30, 40, 50, 100, and 1000, such as CT scans, are received for each segmented bone in the reference frame. Then, as shown at 205, one or more anatomical characteristics pertaining to the bone are marked, manually and/or automatically, in each one of the exemplary medical images. As shown at 206, the one or more anatomical characteristics are associated with respective reference anatomical characteristics in the reference frame. Optionally, the registration is performed by an affine transformation process, for example according to a statistical mapping method, such as least squares statistical method. Optionally, the affine transformation includes translation, rotation, scale and/or shear.

Now, as shown at 206, a statistical shape variance model is created according to the registered anatomical characteristics. The statistical shape variance model is optionally generated as described in T. F. Cootes, C. J. Taylor, D. H. Cooper, J. Graham—Active Shape Models—Their Training and Application, Computer Vision and Image Understanding Vol. 61(1), pp 38-59, 1995, which is incorporated herein by reference. For brevity, the statistical shape variance model may be referred to herein as a skeletal atlas.

Optionally, as shown at 207 points of contact and/or distances between adjacent bones are defined and marked in the skeletal atlas. Optionally, as shown at 208, articulation points between bones are defined in the skeletal atlas. In such a manner, rotation axes of the bones may be deduced. Optionally, the articulation points are used for defining independent rotation centers of the bones in later stages of the registration, for example during a piecewise scaled-rigid registration, for example as described in relation to 403 in FIG. 4 below. An example for such an independent rotation center is the knee joint that can be considered as a rotation center for the tibia bone.

The process depicted in FIG. 2 may be repeated a plurality of times for creating a number of different skeletal atlases, each mapping an exemplary skeleton of a member of a different demographic segment, such as gender, age range, race, and/or or any segment of the population, for example white males in the age between 21 and 42 and/or any union or intersection of a number of demographic segments.

Reference is now made, once again, to FIG. 1. After the skeletal atlases are created and hosted in the repository, as shown at 101, a medical image is received, as shown at 102. The medical image is received either directly from a medical imaging system or modality and/or indirectly via a content source such as a picture archiving communication system (PACS) server, a PACS workstation, a computer network, or a portable memory device such as a DVD, a CD, a memory card, etc. Optionally, each medical image is associated with medical information needed for the atlas selection that is described below. Such medical information may comprise the patient age, gender, medical condition, ID, and the like.

As shown at 103, an atlas is selected according to the demographic segment of the patient that is depicted in the received medical image. The atlas may be selected manually, for example according to the inputs of the system operator and/or automatically, for example by analyzing the associated information, for instance from an imaging and communications in medicine (DICOM) header of a medical image, such as a CT scan. Optionally, the atlases are created to match demographic segments which are defined in the DICOM standards, see DICOM standard published by national electrical manufacturers association in ftp://medical.nema.org/medical/dicom/2008/, which is incorporated herein by reference.

Figure 3:
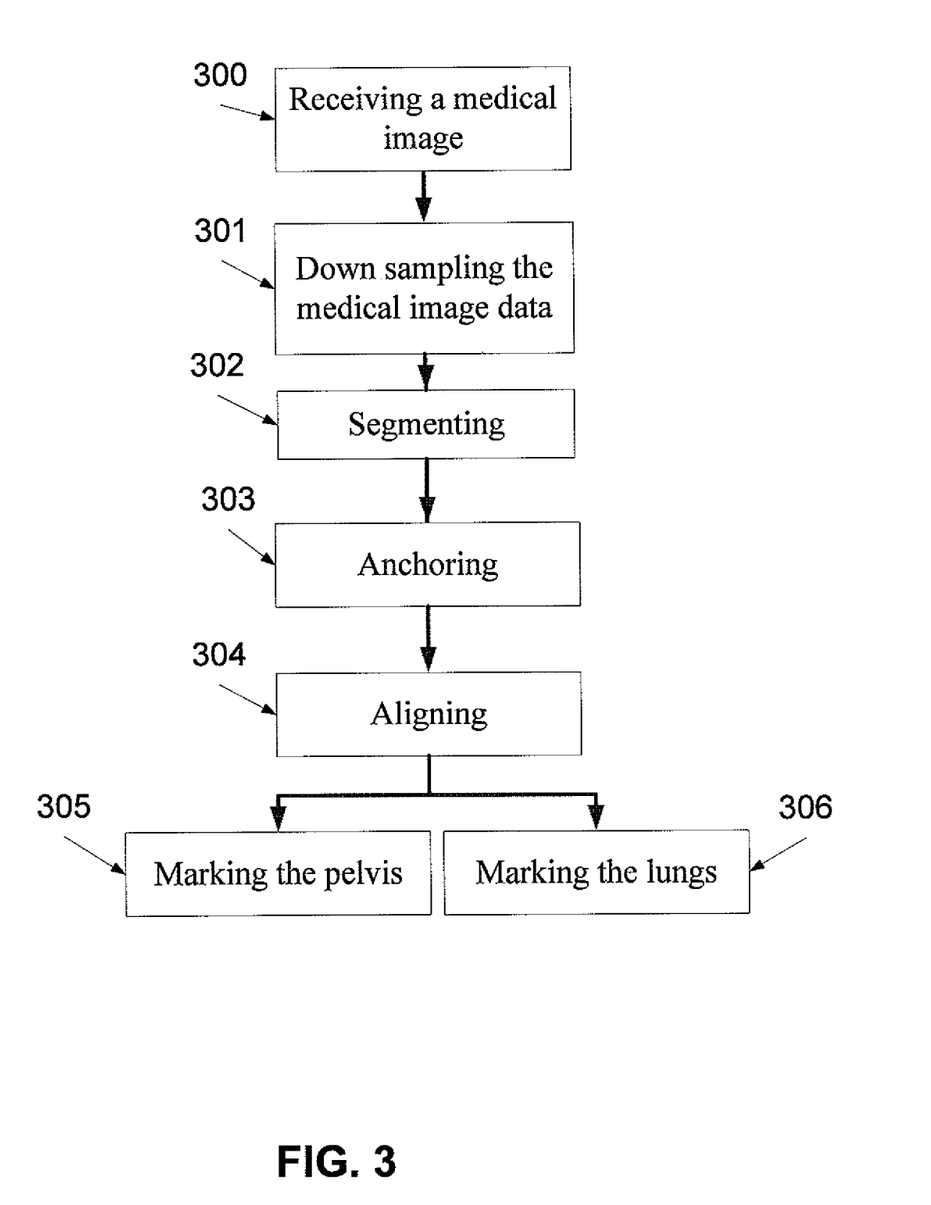
FIG. 3 is a flowchart of preprocessing a medical image for registration according to some embodiments of the present invention.

As shown at 104, the medical image may be preprocessed before being registered according to the skeletal atlas. Reference is now also made to FIG. 3, which is a flowchart of preprocessing a medical image for registration according to some embodiments of the present invention. As shown at 300, the preprocessing includes receiving a medical image. As shown at 301, the preprocessing includes down-sampling for further processing at a lower resolution. For example, the resolution of the medical image may be reduced to isotropic 3 millimeter per pixel (MMP), 6MMP, 15MMP or any intermediate value. Now, as shown at 302, the organs depicted in the medical image are identified and segmented, for example using the method that is described in international patent application publication number WO/2008/062415 filed on Nov. 22, 2007, which is incorporated herein by reference. This initial registration and manipulation method allows removing and/or otherwise separating objects which are not part of depicted human body, such as a scanner bed, tubes, medical devices and wires, from the imaged tissues in the medical image.

Now, as shown at 303, anchors indicative of bones, body segments, and/or different organs are identified in the medical image. The anchor identification may be adjusted to the organ imaged in the medical image. For example, if the medical image depicts one or more bones which are characterized by relatively high density, such as long lower limb bones, for example femur and/or tibia, the bones are segmented according to the Hounsfield unit (HU) thresholding methods. For example, long lower limb bones may be identified using a threshold of 900 HU. Such thresholding methods allow generating a binary mask. Techniques such as principal component analysis (PCA) may be used for classifying the binary masks after the thresholding. In such a manner, false positives, such as high-density foreign objects, are ruled out from the patient's body, see Digital Image Processing, second ed. R. C. Gonzalez and R. E. Woods. Chapter 11.4 (ISBN 0-201-11026-1), which is incorporated herein by reference.

The anchor identification may be based on the expected shape of the bones, for example long lower limb bone components are expected to be long, tubular, and vertical to the scanning direction.

The anchor identification may be selected by analyzing the medical data that is associated with the medical image, for example as described above.

Additionally or alternatively, slices of the medical image are clustered to allow the identification of segments of bones which are only partly depicted in the medical image, for example where a portion of the bone is not depicted in the medical image. The clustering may be performed by matching series of two or more consecutive axial slices; each depicts a component having substantially the same orientation and/or expected shape as a similar component in preceding and/or subsequent consecutive slices. For example, the expected shape of a long lower limb bone in a slice of an axial cross section is substantially annular. Optionally, the ends of each bone are stored as anchors.

Now, as shown at 304, the medical image may be aligned. Optionally, the alignment is performed by identifying a symmetry plane in the medical image. For clarity, the symmetry plane divides the depicted skeleton or a depicted segment thereof to left and right sides. The symmetry plane passes via the center of the skull and the center of the torso. As the position and/or orientation of the patient that is imaged in the medical image may not be fixed, the images may not be aligned in relation to one another and/or in relation to the reference frame. The alignment allows adjusting the input studies according the alignment of the skeletal atlas. Optionally, the alignment is relative to the reference scans in the reference frame. Optionally, the alignment is made by matching the symmetry plane of the skeletal structure in the medical image and the symmetry plane of the respective reference scans in the reference frame. Optionally, the symmetry plane is measured in slices that depict the upper body. For each scan of the medical image, an axis passing through the center of mass of the depicted organs is found. Then, a symmetry plane that passes through these axes is constructed in manner that maximizes the symmetry between the right and left sides of the depicted skeleton. Optionally, the symmetry between the right and left sides is measured according to a normalized correlation between parallel planes which are at the same distance from a common axis of the symmetry plane. Optionally, the construction is made in two stages. First, a rough search at around 15 degrees intervals is performed. In each interval, a localized search around respective local minima is performed at around 2 degrees interval.

Now, as shown at 305, the medical image is analyzed to determine whether it includes a segment that depicts the pelvis or not. The identification of the pelvis segment allows tagging the two external points of the central slice as anchors for the registration. The pelvis anchors may be identified and tagged as follows:

1. Receiving the aligned medical image or a low resolution version thereof.
2. Identifying a signature of left and/or right extremities of the pelvis in the aligned medical image. Optionally, the signature is identified by calculating $x_L(z)$, $x_R(z)$ and $y_L(z)$, $y_R(z)$ where z=f(vertical axis, index of axial slices), and $x_L$, $y_L$ (resp. $x_R$ and $y_R$) are the x and y coordinates of the leftmost (resp. rightmost) high-intensity voxels, for example 300HU or more, in the aligned axial images. A pelvis is depicted in a slice if both $x_L(z)$ and $x_R(z)$ are parabolic and $y_R(z)$, $y_L(z)$ are linear. The central slice index of such a signature is passed on as a pelvis indicator candidate.

3. Identifying a path connecting between the pelvis extremities in a number of consecutive slices selected according to the central slice index. A set of consecutive slices with such a path indicates that the medical image depicts the pelvis. Such a path, referred to herein as a pelvis path, has a parabolic overall shape and passes through voxels with relativity high bone-intensity, for example via voxels having an intensity between 300HU and 600HU. Optionally, the pelvis path is found according to a fast marching algorithm, see Cao, S., and Greenhalgh, S. A., 1994, Finite-difference solution of the eikonal equation using an efficient, first-arrival wavefront tracking scheme: Geophysics, 59, no. 4, 632-643, which is incorporated herein by reference. Optionally, the path is graded according to its shape, and the sum of profile grades on the HU intensity profiles normal to the path. The profile grade depends on the response to a second derivative filter.

4. Tagging the pelvis extremities in the slice with highest path score as anchors for the registration.

Now, as shown at 306, the medical image is analyzed to determine whether it includes a segment of scans that depicts the lungs. Optionally, one or more lungs anchors are identified and tagged in such a segment. Optionally, the lungs anchors are identified by detecting voxels having HU intensity that is slightly above the HU intensity of air (between −980 HU and −500 HU). Optionally, the lungs anchors are identified as follows:

1. Identifying consecutive scans that depict a component having a large cross-sectional area having a HU intensity that is slightly above the HU intensity of air (between −980 HU and −500 HU).
2. Filtering scans which are not parts of a segment depicting a component having a relatively large overall volume. For example, if the total height of consecutive lung slices is more than 60 mm, the cross section area of the central slice is at least 3000 $mm^2$.
3. Filtering scans in which the variance between the center of mass of the consecutive scans is relatively high. In such a manner, abdominal cavities with large cross sectional area are filtered.
4. Tagging one or more anchors indicative of the orientation of the lungs in one or more of the scans which have not been filtered.

Reference is now made, once again, to FIG. 1. After the preprocessing and generation of the atlas the medical image may be superimposed onto the atlas, optionally according to a progressive registration, for example as shown at 105. In such a manner, the 3D shape of the organs depicted in the medical image is mapped to a 3D exemplary skeleton that is defined by the skeletal atlas. The mapping may be defined by an equation that maps each voxel in the medical image to a respective voxel in the atlas or vice versa. The mapping, which may be referred to as warping, may be defined locally for each voxel and/or globally for segmented voxels. The progressive registration may be referred to herein as a warping transformation. Such a registration allows increasing the resolution of the medical image and/or the number of degrees of freedom (DOF).

Optionally, in order to reduce the computational complexity of the registration process, the progressive registration is based on matching binary data that is obtained from bone intensity threshold, for example of a bone intensity of more than 150 HU. Such a matching allows reducing the memory requirements and increasing the computational efficiency.

Figure 4:
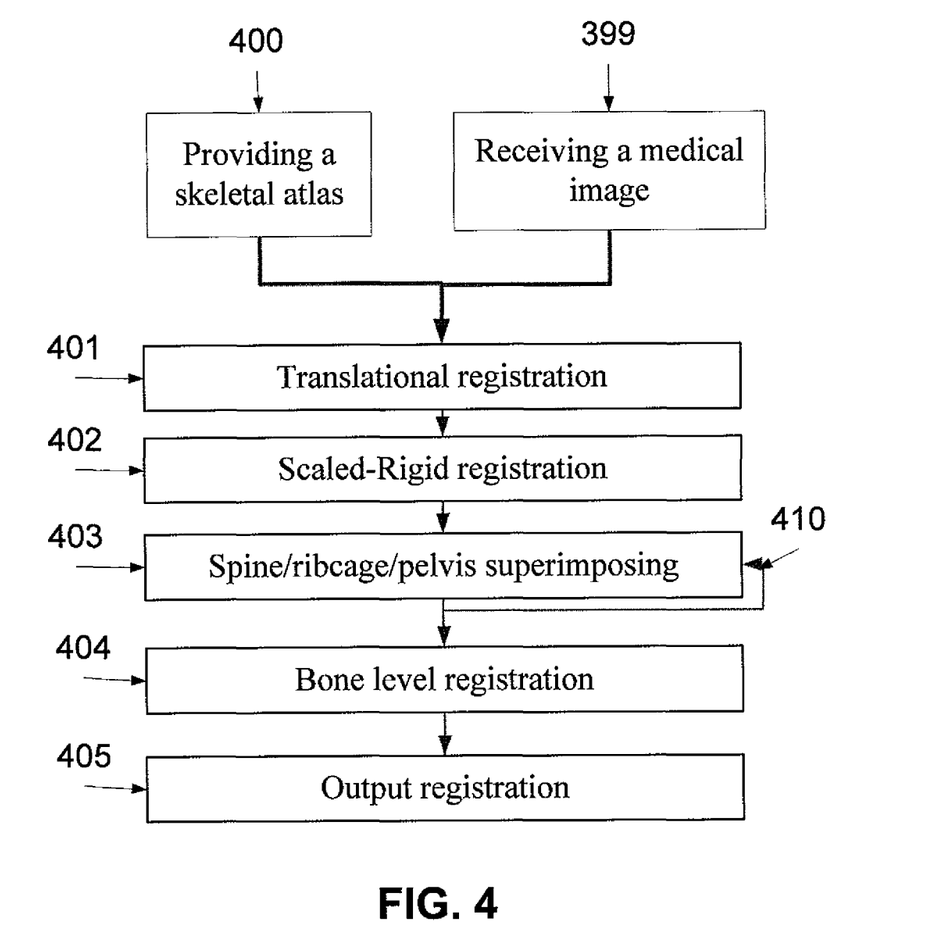
FIG. 4 is a schematic illustration of a method for registering a medical image according to a skeletal atlas, according to some embodiments of the present invention.

Reference is now also made to FIG. 4, which is a schematic illustration of a method for registering a medical image with a skeletal atlas, according to some embodiments of the present invention. As further described below, the progressive registration may be performed by a plurality of warping transformations, each having a different transformation type and/or optimization. During the progressive registration, the superimposing of the medical image onto the atlas is scored. Such a score may be referred to herein as a matching score.

As shown at 400 and 399 the method is based on a skeletal atlas and a medical image which have been respectively segmented and preprocessed as described above.

First, as shown at 401, a translational registration is performed. Optionally, a minimal volume overlap between the transformed atlas and the medical image is required. In such an embodiment, the matching score of each transformation may be based on a binary correlation between the medical image mask obtained by a threshold of 150HU, and the atlas. Optionally, the correlation is constrained by anchors detected in the medical image. The constraints encourage a registration that positions reference anchors close to the anchors detected in the medical image by an additive component that scores a proportional distance between the anchors. Such scoring may be performed in similar manner to the distance constraints which are described below. Optionally, the distance is between the anchor detected in the input image and the corresponding transformed reference anchor.

As shown at 402, the medical image is registered according to a Scaled-Rigid registration which is based on the torso depicted in the medical image. During the Scaled-Rigid registration, 9-degrees of freedom that include translation, rotation, and scaling of the torso, are matched. Optionally, the matching is performed according to a downhill simplex search method, for example as described in Numerical recipes in C (2nd ed.): the art of scientific computing. Cambridge University Press, 1992, which is incorporated herein by reference. Optionally, the match is conducted on the outcome of the initial registration process.

The matching may be performed according to a correlation between the binary atlas bone mask and a thresholded version of the medical image. Additionally or alternatively, the matching score for the superimposing may be defined according to a correlation between a thin shell of bones in the skeletal atlas and a complement of the thresholded version of the medical image. Such a correlation may be performed as a hit-miss transform (HMT). Optionally, the aforementioned thin shell is computed with a morphological dilation of the segmented bone, roughly 2 mm of dilation, followed by subtraction of the bone, and stored along with the bone masks. Optionally, the thin shell is manually segmented around each bone.

As shown at 403, the medical image is registered according to the superimposing of the spine, the ribcage, and/or the pelvis, for example using a piecewise scaled-rigid registration with independent scaled-rigid transformations, optionally using the aforementioned articulation points. Optionally, the superimposing is performed using downhill simplex search method, for example as described in Numerical recipes in C (2nd ed.): the art of scientific computing, which is incorporated herein by reference. Optionally, the superimposing is conducted on the outcome of block 402.

A superimposition that is based on the pelvis and the spine may be based on correlations which are similar to the aforementioned correlations in block 402. The superimposition of the ribcage may be based on a distance transform of the medical image's ribs. Optionally, such a distance transform is obtained by morphological filtering of the thorax. The heart and small thoracic vessels are filtered by closing and cavity filling of the lung mask 306. The aorta is filtered by opening with a vertical cylinder structuring element. After removing some or all of the prominent thoracic soft tissues, the remaining voxels, identified as voxels of the ribs and the spine, are the source of the distance transform. In such a manner, a gradient of distances is produced from the center of the thorax to the ribs, and from the outside inwards towards the ribs. Optionally, the superimposition of the ribcage is based on a correlation between the lungs of the skeletal atlas and the lungs in the medical image, optionally constrained by the anchors that have been identified during the preprocessing of the medical image.

Optionally, the overall matching score that is given during this transformation depends on structural constraints which are defined in the superimposed skeletal atlas. For example, according to expected range of distances between the bones. In such an embodiment, the registration may depend on a set of structural constraints which are defined in the atlas. For example, the registration is performed to match the distances between the bones in the medical image and to the distances which are provided in the atlas. It should be noted that the structural constraints map contact points between bones.

As described above, the atlas defines, inter alia, the orientation of a plurality of organs and/or bones. As such, estimated distance between different organs and/or bones may be deduced and/or provided. Optionally, a set of structural constraints, such as distance constraints, is provided and/or generated. Each distance constraint defines a possible distance or a range defining a possible distance between two bones. Optionally, each distance constraint is associated with a dynamic attractive force that may be changed according to the estimated distance between the bones and/or according to a matching score of a suggested transformation. In some embodiments of the present invention, each distance constraint, which may be referred to as a contact constraint, consists of the following values:

Two transformations denoted by $T_1$ and $T_2$ and assigned to two organs and/or bones in contact.

A contact point denoted by p and reflects a contact point of the body parts in the atlas.

An attractive force minimum distance threshold, denoted by s-defines a distance below which the attractive force is zero.

An attractive force maximum distance threshold, denoted by d, which defines a distance at which the attractive force is maximal.

The attractive force of the $i^{th}$ constraint is $E_i=k[x_i-s_i)/d_i]^2$, where $x=dist(T_1(p),T_2(p))$ and $k=f(matching\ score)$ The attractive force is zero if $x_i<s_i$.

Optionally, the attractive force increases as the matching score is higher. In such an embodiment, the attractive forces are initially set low, to allow freedom of registration, and get higher when the optimization converges. As depicted in 410, this registration is performed in a number of iterations, optionally 2, 3, 4, 5, 10, and 100. In such an embodiment, a low barrier to the freedom for the registration may be allowed in the first iterations by defining low attractive forces initially and a high barrier to the freedom of registration may be allowed in the final iterations by defining high attractive forces for completion.

The attractive force is added to an overall energy score. In such a manner, the aforementioned piecewise scaled-rigid registration maintains a rough structural integrity.

Optionally, this registration is performed according to one or more thin plate spline (TPS) transformations. Optionally, each TPS transformation is defined between a volume warping defined in the atlas and a volume warping defined in the space of the medical image. Optionally, if the medical image is taken from a medical database, such as PACS, only the volumes of the atlas are warped.

Optionally, each transformation is performed as a TPS anatomical characteristic-based transformation, see F. L. Bookstein—Principal warps: Thin-plate splines and the decomposition of deformations. PAMI 11(6), pp 567-585, 1989, which is incorporated herein by reference. Such a transformation registers anatomical characteristics in the medical image to respective anatomical characteristics in the atlas and interpolates between them according to an energy minimization solution that is related to warping of physical thin plates. Optionally, the number of DOF in each transformation is three times the number of anatomical characteristics.

Now, as shown at 404, bones and/or group of bones, for example of a certain organ, are separately registered in a process which may be referred to herein as a bone level registration. As described above, the atlas maps and/or models a plurality of anatomical characteristics in a plurality of bones. Some of the anatomical characteristics maybe shared by a number of neighboring bones, for example the femur and the tibia share knee anatomical characteristics. The separate registration of bones and/or organs increases the robustness of the process.

The bone level registration may be performed according to a warping transformation that is based on a mode-based warping of bones. Such a warping transformation is based on an affine transform optionally followed by a thin plate warping that is defined according to the positions of the anatomical characteristics. Optionally, the warping transformation has a total of 12+3·n DOF, where n denotes a number of anatomical characteristics, for example 12 anatomical characteristics for the spine and 77 anatomical characteristics for the ribcage.

As described above, the atlas comprises statistical shape models of the bones in the skeletal atlas. Optionally, each model consists of a mean shape, described by a mean position based on the anatomical characteristics of the respective bone, and several modes of prominent variance, described by vectors of simultaneous translation of these anatomical characteristics. Each mode describes a non-affine variance of a common bone shape. Optionally, between 8 and 12 modes are used in order to cover between 85% and 90% of the learned variance. For example, the first mode of the spinal vertebrae describes an 's' shaped warping of the spine when viewed sagitally; the second mode describes a similar warping but with 3 curls; and the third describes 's' curls in the coronal view, which is characteristic of scoliotic patients. Such modes account for 55% of the variance learned from the statistics. A total of 10 modes accounts for 88% of the variance.

Optionally, the search during the warping transformation is performed in a reduced space of affine and/or mode parameters. In such a process, each one of the bones and/or organs receives a component matching score that is optionally iteratively improved, for example in a number of transformations. In such a manner, the computational complexity may be reduced and the efficiency and/or robustness of the optimization procedure may be increased. Such a search produces only deformations learned from examples. In order to take into account shared anatomical characteristics during the bone level registration, each bone and/or organ is marked as active, passive, or idle. During the bone level registration, the registration of bones and/or organs which are tagged as active is scored whenever there is a change in the search parameters, which are the coordinates of simplex vertices. The search parameters are the values of the affine coefficients, for example 9 or 12, and the coefficients of the modes. For example, if the mode coefficients are null, there is no deformation and the mean shape is transformed by the affine transformation. However, if the coefficients have relatively large values, for example three times their standard deviation, then the mean shape undergoes extreme warping which is penalized by the optimization score, for example as described below.

The registration of bones and/or organs, which are tagged as passive bones and/or organs, is scored only when one or more of shared parameters are changed. At each step of the optimization, the value of a subset of the parameters is changed. Only some of these parameters are shared by two transformations. For example, if only the affine parameters of the femur are changed, the tibia score remains the same. However, if a parameter affecting the position of the knee is changed, then the tibia score has to be computed as well.

The registration of bones and/or organs which are tagged as idle is not scored. As the shared anatomical characteristics are marked, the process may be optimized by dividing the optimization into a set of functions which have partial dependencies. In such a manner, only the relevant parts of the function which are related to the shared anatomical characteristics have to be computed after each stage of the optimization.

Optionally, the bones are separately registered in the following order: the spine, the ribcage, the femur bones, the pelvis, the tibia bones, and/or the fibula bones. Optionally, the skull and/or the feet in the medical image are also registered. Optionally, the bones of the skull and the feet are sequentially set active while respective neighboring bones are set passive and the rest of the bones are set idle. Optionally, the registration of bones, such as the upper body bones, is initialized from the previous registration stages. Optionally, the registration of bones, such as the lower limb bones, is initialized from anchors found during pre-processing of the medical image, for example as described above in relation to 303.

It should be noted that the matching score of the medical image is calculated according to the component matching scores, the aforementioned distance constraints, and a penalty term for high deformations, see F. L. Bookstein—Principal warps: Thin-plate splines and the decomposition of deformations, PAMI 11(6), pp 567-585, 1989, which is incorporated herein by reference.

As shown at 405, after the progressive registration is completed a set of output registrations, optionally at the bone level, is provided. In such a manner, points in the space defined by the skeletal atlas are mapped to respective points in the received medical image.

Such a registration may be used for estimating the location of bone tissues and soft tissues between them, for example by means of interpolation of the registration of adjacent bones. Such estimation may be used for initializing a registration of a soft-tissue registration process and/or the adjusting thereof.

Reference is now made, once again, to FIG. 1. The registration of a medical image to a skeletal atlas, described hereinabove, may be used for the segmentation of bones, for example as described in application by Yaron Ostrovsky-Berman, entitled method and system for segmenting medical imaging data according to a bone model, which the content thereof is incorporated by reference as if fully set forth herein.

Optionally, the registration of a medical image to a skeletal atlas, described hereinabove may be used for automatic vessel identification, tracking, and/or segmentation. For example, the registration may be used for centerline and lumen segmentation of the major arteries, such as the aorta, the abdominal, the iliac arteries, the femoral arteries, and the tibial arteries, in CT angiography images. As described above, the registration allows matching between selected anatomical characteristics. Such as vascular characteristics, on the skeletal atlas and a region of interest (ROI) that includes indicative anchors, as described above, in the medical image where the vessel should be located. Optionally, the registration of a medical image to a skeletal atlas, described hereinabove is based for navigation of a medical device, such as a catheter or an endoscope in medical images, such as CT scans. In such an embodiment, the registration may be performed online, during the conducting of the medical device in the body of the patient, or beforehand, for example while preparing a base image for an endoscopic procedure. Such a registration improves the ability of a practitioner to accurately zoom a treated area.

Figure 5:
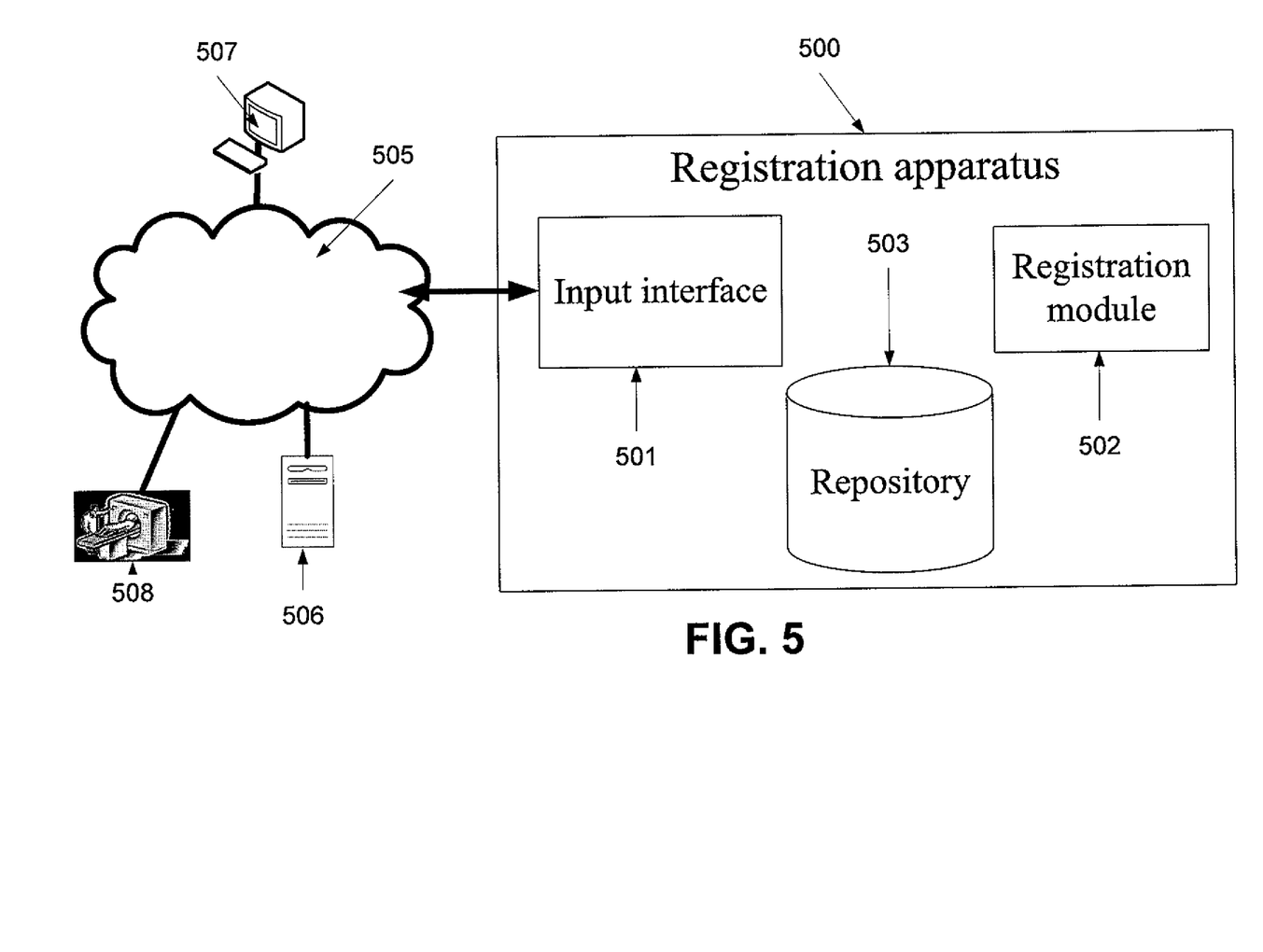
FIG. 5 is a schematic illustration of an apparatus for registering a medical image according to a skeletal atlas, according to some embodiments of the present invention.

Reference is now also made to FIG. 5, which is a schematic illustration of an apparatus 500 connected to a communication network 505, such as the internet, for registering a medical image with an atlas mapping a skeletal structure, for example according to the method depicted in FIG. 1, according to some embodiments of the present invention. The apparatus comprises an input interface 501 configured for receiving a medical image of a plurality of bones of a patient. The input interface 501 optionally receives the medical image from remote medical databases 506 imaging modalities 508, and/or remote client terminals 507, for example as described in Provisional U.S. Patent Applications No. 61/071,709 and Patent application No. 61/071,708 both co-filed on May 14, 2008, the contents of which are hereby incorporated by reference. The apparatus 500 further comprises a repository 503 that stores one or more skeletal atlases, for example as described above. Each skeletal atlas maps a reference skeletal structure having a plurality of reference anatomical elements, such as reference bones. The apparatus 500 further comprises a registration module 502 for registering some or all of the bones in the medical image with respective reference anatomical elements, such as reference bones from the atlas, for example as described above in relation to FIG. 1. Optionally, the registration described hereinabove may be used for registering and optionally segmenting medical images in a medical database 506, such as the PACS. Such an application may be activated automatically and/or according to user inputs (UI), such as UI received via a graphical user interface (GUI). The user inputs allow a user to select a segmented area, such as a bone and/or an area, in a medical image. Such a selection may used for linking the user to data related to the segmented bone and/or organ, changing the presentation of the segmented bone and/or organ, notifying the system that this segmented bone and/or organ has been probed, and/or adding an analysis related to the segmented bone and/or organ has been probed. Additionally or alternatively, such a registration allows integrating a PACS into an external anatomy and pathology databases that is based on organ identification. The user clicks on an organ, and the relevant information from the PACS database is displayed.

It is expected that during the life of a patent maturing from this application many relevant systems and methods will be developed and the scope of the terms medical image and imaging is intended to include all such new technologies a priori.

As used herein the term "about" refers to ±10%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A computerized method for registering a medical image with a model mapping a skeletal structure, comprising:
    a computerized system receiving a medical image depicting a plurality of bones;
    said computerized system providing a statistical model mapping a reference skeletal structure having a plurality of reference anatomical elements, wherein the statistical model of at least one of the reference anatomical elements comprises a distribution of a plurality of respective anatomical characteristics of the at least one of the reference anatomical elements in a plurality of medical images;
    said computerized system registering anatomical elements in said medical image with corresponding anatomical elements in said statistical model according to at least one constraint defined by said plurality of reference anatomical elements, and
    said computerized system producing an image transformation corresponding to the registering;
wherein said registering comprises searching for a warping transformation, defined by parameters of an affine transformation and warping parameters, that increases a matching score of the medical image to the reference skeletal structure, wherein the searching is done progressively in a plurality of iterations, with different reduced sets of warping parameters defining warping local to different bones or groups of bones, the parameters being allowed to vary their values in different iterations.

2. The method of claim 1, wherein said registering comprises registering each said bone to a respective said reference anatomical element.

3. The method of claim 1, wherein said receiving comprises identifying a plurality of anchors each indicative of a specific anatomical characteristic in said medical image data, wherein said registering is performed according to a match between at least one of said plurality of anchors.

4. The method of claim 1, further comprising identifying a symmetry plane in said medical image and aligning said medical image according to said symmetry plane before said registering.

5. The method of claim 1, wherein said statistical model mapping at least one pelvis anchor in said skeletal structure, further comprising identifying a signature of the pelvis in said medical image, performing said registering by matching between said signature and said at least one pelvis anchor.

6. The method of claim 5, wherein said signature is a path connecting between pelvis extremities depicted in said medical image.

7. The method of claim 1, wherein said statistical model mapping at least one lungs characteristic in said skeletal structure, further comprising identifying a signature of the lungs in said medical image and performing said registering by matching between said signature and said at least one lungs characteristic.

8. The method of claim 1, further comprising segmenting a plurality of bones in said medical image, said registering comprises progressively registering said medical image data with said statistical model; wherein each said progressive registration is performed by registering a different said bone with at least one anatomical characteristic defined in a respective said reference anatomical element.

9. The method of claim 1, wherein said statistical model mapping a thin shell around said bones, at least one of said plurality of warping transformations being directed according to a correlation between said medical image and said thin shell.

10. The method of claim 1, wherein said statistical model mapping a distance between two bones of said skeletal structure, at least one of said plurality of warping transformations being directed according to a level of compliance of a current registration of two respective said bones with said distance.

11. The method of claim 1, wherein said plurality of warping transformations being directed according to a level of compliance of said current registration.

12. The method of claim 1, wherein said statistical model mapping a plurality of reference anatomical characteristics for each said reference anatomical element, said registering is constrained according to said plurality of reference anatomical characteristics.

13. The method of claim 8, wherein said registering comprises performing a transformation is based on at least one thin plate spline (TPS) transformation.

14. The method of claim 1, wherein said registering comprises separately registering each of a plurality of bones depicted in said medical image according to at least one of said plurality of reference anatomical characteristics of a respective said reference anatomical element.

15. An apparatus for registering a medical image with a model mapping a skeletal structure, comprising:
    an input interface configured for receiving a medical image of a plurality of bones of a patient;
    a repository configured for hosting a statistical model mapping a reference skeletal structure having a plurality of reference anatomical elements, wherein the statistical model of at least one of the reference anatomical elements comprises a distribution of a plurality of respective anatomical characteristics of the at least one of the reference anatomical elements in a plurality of medical images; and
    a registration module configured for registering said medical image with said statistical model according to at least one constraint defined by said plurality of reference anatomical elements;
wherein said registering comprises searching for a warping transformation, defined by parameters of an affine transformation and warping parameters, that increases a matching score of the medical image to the reference skeletal structure, wherein the searching is done progressively in a plurality of iterations, with different reduced sets of warping parameters defining warping local to different bones or groups of bones, the parameters being allowed to vary their values in different iterations.

16. The apparatus of claim 15, wherein said repository configured for hosting a plurality of statistical models each associated with at least one of a plurality of demographic segments, said input interface being configured for receiving medical data indicative of a patient demographic segment pertaining to said patient; wherein said statistical model is selected from said repository according to a match between said patient demographic segment and said plurality of demographic segments.

17. The method of claim 1 in which the anatomical characteristics of the at least one of the reference anatomical elements comprise a shape of the at least one of the reference anatomical elements.

18. The method of claim 1 in which the statistical model comprises a statistical shape model.

19. The method of claim 1 in which the registering further comprises:
    identifying a signature of anatomical element in the medical image; and
    performing said registering by matching between the signature of the anatomical element and at least one corresponding anatomical elements in said statistical model.

20. The method of claim 18 and further comprising:
    calculating a score for the matching;
    marking at least some of the anatomical elements as one of active, passive, and idle; and
    the score of matching the passive anatomical element is used only when one or more of parameters shared between the active anatomical element and the statistical model of the reference anatomical elements are changed, and the score of matching the idle anatomical element is not used.

21. The method of claim 1, wherein registering comprises searching for a warping transformation that increases a matching score of the medical image to the reference skeletal structure, the matching score depending on structural constraints which are defined for the reference skeletal structure.

22. The method of claim 21, wherein the structural constraints comprise constraints on distance between different bones.

23. The method of claim 1, wherein registering comprises searching for a warping transformation that increases a matching score of the medical image to the reference skeletal structure, the matching score having a penalty for transformations with sufficiently large warping mode coefficients.

24. A computerized method for registering a medical image with a model mapping a skeletal structure, comprising:
    a computerized system receiving a medical image depicting a plurality of bones;
    said computerized system providing a statistical model mapping a reference skeletal structure having a plurality of reference anatomical elements, wherein the statistical model of at least one of the reference anatomical elements comprises a distribution of a plurality of respective anatomical characteristics of the at least one of the reference anatomical elements in a plurality of medical images;
    said computerized system registering anatomical elements in said medical image with corresponding anatomical elements in said statistical model according to at least one constraint defined by said plurality of reference anatomical elements, and said computerized system producing an image transformation corresponding to the registering;
wherein registering comprises searching for a warping transformation that increases a matching score of the medical image to the reference skeletal structure, the matching score depending on structural constraints, comprising constraints on distance between different bones, which are defined for the reference skeletal structure.

* * * * *